(12) United States Patent
Coleman et al.

(10) Patent No.: US 10,757,027 B2
(45) Date of Patent: Aug. 25, 2020

(54) QUALITY OF SERVICE MANAGEMENT IN A SATELLITE PLATFORM

(71) Applicant: Vector Launch Inc., Tucson, AZ (US)

(72) Inventors: Shaun Coleman, San Jose, CA (US); Darren D. Garber, Rancho Palos Verdes, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 15/654,082

(22) Filed: Jul. 19, 2017

(65) Prior Publication Data

US 2019/0028394 A1    Jan. 24, 2019

(51) Int. Cl.
| | |
|---|---|
| H04L 12/851 | (2013.01) |
| H04W 28/16 | (2009.01) |
| H04B 7/185 | (2006.01) |
| H04W 28/02 | (2009.01) |
| G06F 9/455 | (2018.01) |
| G01S 19/28 | (2010.01) |
| G06F 9/451 | (2018.01) |

(52) U.S. Cl.
CPC ......... *H04L 47/24* (2013.01); *H04B 7/18521* (2013.01); *H04W 28/0226* (2013.01); *H04W 28/16* (2013.01); *G01S 19/28* (2013.01); *G06F 9/452* (2018.02); *G06F 9/45533* (2013.01)

(58) Field of Classification Search
None
See application file for complete search history.

(56) References Cited

U.S. PATENT DOCUMENTS

| | | |
|---|---|---|
| 4,912,656 A | 3/1990 | Cain et al. |
| 5,410,728 A | 4/1995 | Bertiger et al. |
| 5,414,432 A | 5/1995 | Penny, Jr. et al. |
| 5,467,345 A | 11/1995 | Cutler, Jr. et al. |
| 5,471,641 A | 11/1995 | Dosiere et al. |
| 5,483,664 A | 1/1996 | Moritz et al. |
| 5,561,838 A | 10/1996 | Chandos et al. |
| 5,666,648 A | 9/1997 | Stuart |
| 5,678,175 A | 10/1997 | Stuart et al. |

(Continued)

FOREIGN PATENT DOCUMENTS

| | | |
|---|---|---|
| CN | 101459946 A | 6/2009 |
| CN | 104902515 A | 9/2015 |

(Continued)

OTHER PUBLICATIONS

Notification of Transmittal of the International Search Report and the Written Opinion of the International Searching Authority, or the Declaration received in International Application No. PCT/US2016/059623, dated Jan. 9, 2017, 12 pages.

(Continued)

*Primary Examiner* — Yaotang Wang

(57) ABSTRACT

Systems, methods, and software described herein provide enhancements for managing quality of service for data communications on a satellite of a satellite platform. In one implementation, a satellite obtains a plurality of packets to be transmitted to a second system of the satellite platform. Once obtained, the satellite prioritizes the transmission of the plurality of packets based on a quality of service associated with each of the packets, and transmits the plurality of packets based on the prioritization.

20 Claims, 10 Drawing Sheets

(56) References Cited

U.S. PATENT DOCUMENTS

| | | |
|---|---|---|
| 5,722,042 A | 2/1998 | Kimura et al. |
| 5,724,345 A | 3/1998 | Guarneri et al. |
| 5,867,765 A | 2/1999 | Nilsson |
| 5,886,991 A | 3/1999 | Guarneri et al. |
| 5,925,092 A | 7/1999 | Swan et al. |
| 6,178,163 B1 | 1/2001 | Yuan et al. |
| 6,301,476 B1 | 10/2001 | Monte et al. |
| 6,366,761 B1* | 4/2002 | Montpetit ............... H04B 7/195 370/230 |
| 6,512,920 B1 | 1/2003 | Yaoya |
| 6,603,957 B1 | 8/2003 | Sherman et al. |
| 6,868,316 B1 | 3/2005 | Stevens |
| 6,985,454 B1 | 1/2006 | Wiedeman et al. |
| 7,151,929 B1 | 12/2006 | Jenkin et al. |
| 7,463,890 B2 | 12/2008 | Herz et al. |
| 7,992,134 B2 | 8/2011 | Hinchey et al. |
| 8,140,816 B2 | 3/2012 | Hofer et al. |
| 8,286,187 B2 | 10/2012 | Hou et al. |
| 8,706,869 B2 | 4/2014 | Campion et al. |
| 8,730,864 B2 | 5/2014 | Natarajan et al. |
| 8,797,969 B1 | 8/2014 | Harel et al. |
| 8,819,659 B2 | 8/2014 | Ramer et al. |
| 9,014,241 B2 | 4/2015 | Dick |
| 9,030,355 B2 | 5/2015 | Jarvis et al. |
| 9,042,295 B1 | 5/2015 | Balter et al. |
| 9,335,417 B2 | 5/2016 | Kim et al. |
| 9,363,712 B2 | 6/2016 | Chuberre et al. |
| 9,442,476 B2 | 9/2016 | Bliss et al. |
| 9,577,704 B2 | 2/2017 | Balter et al. |
| 9,641,238 B1 | 5/2017 | Coleman et al. |
| 9,654,204 B2 | 5/2017 | Ling et al. |
| 2002/0150060 A1 | 10/2002 | Montpetit |
| 2003/0185215 A1 | 10/2003 | Wright et al. |
| 2003/0203717 A1 | 10/2003 | Chuprun et al. |
| 2004/0157598 A1 | 8/2004 | Parkman et al. |
| 2004/0219879 A1 | 11/2004 | Stephenson |
| 2005/0050538 A1 | 3/2005 | Kawamata et al. |
| 2006/0130056 A1 | 6/2006 | Bozak et al. |
| 2008/0155610 A1 | 6/2008 | Rosen |
| 2008/0252514 A1 | 10/2008 | Rigal et al. |
| 2008/0307466 A1 | 12/2008 | Wang |
| 2009/0042562 A1 | 2/2009 | Treesh et al. |
| 2009/0051589 A1 | 2/2009 | Schiff et al. |
| 2010/0058328 A1 | 3/2010 | DeHaan |
| 2011/0044236 A1 | 2/2011 | Giffen et al. |
| 2011/0196451 A1 | 8/2011 | Hill |
| 2012/0020280 A1 | 1/2012 | Jansson et al. |
| 2012/0197552 A1 | 8/2012 | Robinson et al. |
| 2012/0284716 A1 | 11/2012 | Martins et al. |
| 2013/0141307 A1 | 6/2013 | Nurnberger et al. |
| 2013/0194132 A1 | 8/2013 | Kim et al. |
| 2013/0275036 A1 | 10/2013 | Olivier et al. |
| 2013/0275975 A1 | 10/2013 | Masuda et al. |
| 2013/0305218 A1 | 11/2013 | Hirsch et al. |
| 2013/0336168 A1 | 12/2013 | Schlipf et al. |
| 2014/0039963 A1 | 2/2014 | Augenstein et al. |
| 2014/0068546 A1 | 3/2014 | Balasubramanian et al. |
| 2014/0201218 A1 | 7/2014 | Catalano et al. |
| 2014/0297874 A1 | 10/2014 | Matsubara et al. |
| 2015/0078178 A1 | 3/2015 | Carides et al. |
| 2015/0199197 A1 | 7/2015 | Maes et al. |
| 2015/0215030 A1 | 7/2015 | Moore |
| 2015/0219744 A1 | 8/2015 | Eikenberry et al. |
| 2015/0247928 A1 | 9/2015 | Waters et al. |
| 2015/0318916 A1* | 11/2015 | Gopal ................ H04B 7/18519 455/13.1 |
| 2016/0009425 A1 | 1/2016 | Thompson et al. |
| 2016/0037434 A1* | 2/2016 | Gopal ................. H04W 40/246 370/316 |
| 2016/0080072 A1 | 3/2016 | Baudoin et al. |
| 2016/0094288 A1 | 3/2016 | Krebs |
| 2016/0132805 A1 | 5/2016 | Delacourt et al. |
| 2016/0226150 A1 | 8/2016 | Paleta et al. |
| 2016/0242024 A1 | 8/2016 | Karren et al. |
| 2016/0283424 A1 | 9/2016 | Richardson |
| 2016/0314057 A1* | 10/2016 | De Oliveira ........ G06F 11/1484 |
| 2016/0380909 A1* | 12/2016 | Antony ................. H04L 47/722 370/236 |
| 2017/0021947 A1 | 1/2017 | Pellegrino et al. |
| 2017/0026110 A1 | 1/2017 | Richardson et al. |
| 2017/0091047 A1 | 3/2017 | Bangalore et al. |
| 2017/0237804 A1 | 8/2017 | Baughman et al. |
| 2017/0250751 A1 | 8/2017 | Kargieman et al. |
| 2017/0195040 A1 | 11/2017 | Sobhani et al. |
| 2018/0092020 A1* | 3/2018 | Torres .................. H04W 40/20 |
| 2018/0227043 A1* | 8/2018 | Dankberg .......... H04B 7/18515 |

FOREIGN PATENT DOCUMENTS

| | | | |
|---|---|---|---|
| CN | 105471493 A | 4/2016 | |
| EP | 0365885 A2 | 5/1990 | |
| EP | 2319700 A1 | 5/2011 | |
| FR | 2796229 A1 | 1/2001 | |
| FR | 2818055 A1 | 6/2002 | |
| KR | 20130131652 | * 12/2013 | ............... G06F 8/36 |
| KR | 20130131652 A | 12/2013 | |
| WO | 93/09613 A1 | 5/1993 | |
| WO | 95/13671 A1 | 5/1995 | |
| WO | 1996003823 A1 | 2/1996 | |
| WO | 99/39459 A1 | 8/1999 | |
| WO | 2014022810 A2 | 2/2014 | |
| WO | 2015198303 A1 | 12/2015 | |
| WO | 2017023621 A1 | 2/2017 | |
| WO | 2017027602 A | 2/2017 | |

OTHER PUBLICATIONS

Panunzio, Marco et al. "An Architectural Approach with Seperation of Concerns to Address Extra-Functional Requirements in the Development of Embedded Real-Time Software Systems". Journal of Systems Architecture. 2014.

"Describing and Deploying Satellite Behaviors Using Rules-Based Statecharts". Kenneth B. Center. PnP Innovations. 2014.

Romer, Kay et al. "The Design Space of Wireless Sensor Networks". Wireless Sensor Networks. IEEE Wireless Communications, vol. 11, Issue 6. 2004.

* cited by examiner

QUALITY OF SERVICE MANAGEMENT IN A SATELLITE PLATFORM

BACKGROUND

Satellites can be deployed into orbit to provide various space-based operations, such as military and civilian observation operations, communications operations, navigation operations, weather operations, and research operations. Satellites can include various sensors and communication equipment that are used to perform desired tasks. For example, a weather satellite may include one or more cameras or imaging sensors that can be used to take images of Earth, and communication equipment that can be used to communicate the images to a control system on Earth. Although satellites can be configured to perform these specialized operations, satellites are expensive to create and launch into orbit, especially for organizations that may not require the use of an entire satellite with a large number of sensors, or may not require continuous operations on the satellite. As a result, organizations may avoid the use of satellites, limiting the use of promising satellite technology.

OVERVIEW

The technology disclosed herein provides enhancements for quality of service management in a satellite platform. In one implementation, a method of managing data packets communicated over a satellite of a satellite platform includes obtaining a plurality of data packets to be transmitted to other systems of the satellite platform, wherein the systems may comprise other satellites and/or a control system. The method further includes prioritizing the plurality of data packets for transmission based on a quality of service associated with each of the plurality of data packets and transmitting the plurality of data packets based on the prioritization.

This Overview is provided to introduce a selection of concepts in a simplified form that are further described below in the Technical Disclosure. It should be understood that this Overview is not intended to identify key features or essential features of the claimed subject matter, nor should it be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
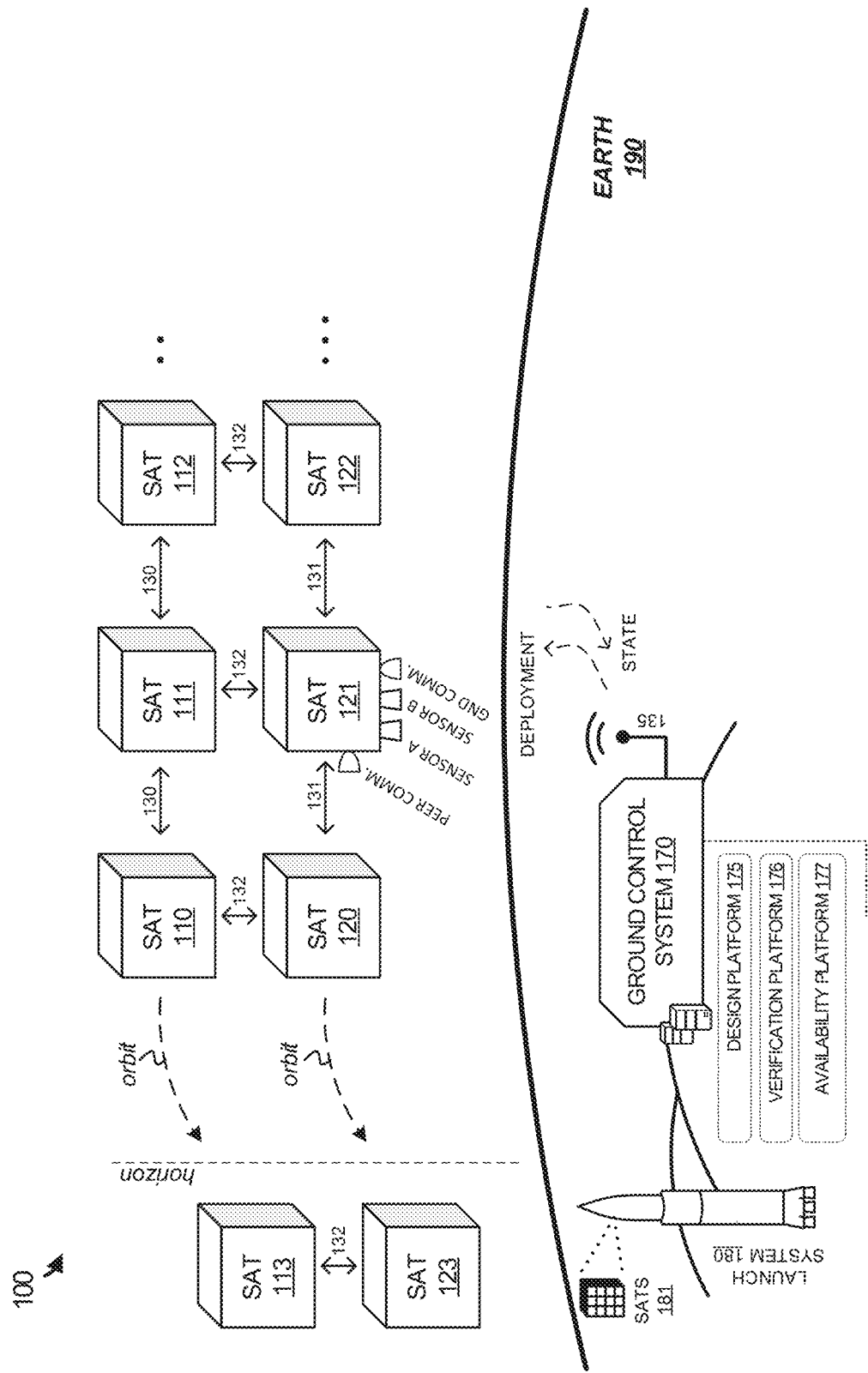
FIG. 1 illustrates a satellite environment according to an implementation.

The various examples disclosed herein provide enhancements for satellite hardware and software technology. In particular, the examples disclosed herein provide systems and methods for deploying software applications to an orbiting satellite platform, wherein each of the software applications executes as a virtual node that can share resources with one or more other applications deployed to the same satellite. These virtual nodes may comprise full operating system virtual machines in some examples, and may further include virtual containers. These containers may include Docker containers, Linux containers, jails, or another similar type of virtual containment node, which can provide an efficient management of resources from a host system. The resources used by the containers may include kernel resources from the host computing system, and may further include repositories and other approved resources that can be shared with other containers or processes executing on the host. However, although resources may be shared between the containers on a host satellite, the containers are provisioned to have private access to the operating system with their own identifier space (namespace), file system structure, and network interfaces.

In the present example, to provide the satellite platform, a plurality of satellites may be deployed, wherein organizations may generate applications and deploy the applications to the satellites to perform desired operations. The operations may include military and civilian observation operations, communications operations, navigation operations, weather operations, and research operations. To develop the applications, a development platform may be provided as part of a ground control system that permits the organizations to develop software applications using a development tool. Once developed using the tool, the applications may be executed in a virtual or physical test environment replicating the physical satellite platform. This test environment may permit the user to upload the software application to one or more test satellites and monitor the operation of the application prior to deploying the application to the physical satellite cluster. In some implementations, in developing the application, the provided development tool may include an application programming interface (API) or some other command structure, which permits the applications to request and access the various sensors and interfaces provided by the physical satellite. Accordingly, although each of the software applications may perform different operations, they may interact with sensors, such as cameras, antennas, and the like using similar commands.

Once an application is developed using the development tool and the test environment, the application may then be deployed in one or more satellites of the orbiting satellite platform. In some implementations, the application may be provided to each of the one or more satellites using a ground control system as an uplink to the one or more satellites. In other implementations, a single uplink may be made to a satellite in the platform, wherein the satellite is configured to distribute the application to other desired satellites in the platform. Once deployed in the environment, the application may execute on the assigned satellites.

In some implementations, in deploying and managing the various virtual nodes within the satellite platform, each of the satellites may use quality of service operations to ensure that each of the virtual nodes (applications) are provided with an adequate quality of service. In particular, each of the satellites may be configured to prioritize the various communication packets as they are transferred to other satellites as well as a ground control system. For example, a satellite may be configured, such that configuration packets (e.g. packets defining an object of interest to be monitored by the satellites) may be prioritized over other data packets exchanged between the satellites of the satellite platform. These other data packets may include state information packets, which may provide processed and unprocessed data for the applications on the virtual nodes (images, data calculations, etc.), health-check information, and the like.

Additionally, or in some examples in place of, prioritizing the data communications between the satellites, the satellites may further be configured to manage the quality of service that is made available to each of the virtual nodes. This quality of service may be determined based on a fee provided by each of the virtual nodes, may be determined based on the geographic location of the satellite, or may be determined in any other similar manner. For example, a virtual node may be deployed by an organization to monitor a particular region on Earth. As a result, when the satellite's orbit coincides with the particular geographic region, the virtual node for the application may be provided with a first quality of service, wherein the quality of service may provide processing resources, sensor resources, communication resources, and the like. However, when the satellite's orbit does not coincide with the geographic region of interest, the virtual node for the application may be provided with a second quality of service, wherein the second quality of service may include decreased processing resources, sensor resources, and the like for the application. Thus, when resources are not required for the virtual node, the resources may be provided to other virtual nodes executing on the satellite or may be used to conserve power resources of the satellite.

Although using geographic location as a quality of service modification event is one example of providing dynamic quality of service to the virtual nodes, it should be understood that the quality of service for each of the nodes may be modified in other manners. For example, a configuration packet may be delivered to the satellite to configure a virtual node to provide a particular task. Based on the task, the quality of service for the virtual node may be increased or decreased to provide the desired operation, and resources may be allocated to the virtual node accordingly.

FIG. 1 illustrates a satellite environment 100 according to an implementation. Satellite environment 100 includes satellites 110-113, satellites 120-123, Earth 190, ground control system 170, and launch system 180. Satellites 110-113 and satellites 120-123 communicate via wireless communication links 130-132. Ground control system 170 communicates with satellites 110-113 and satellites 120-123 using wireless communication link 135.

As described herein, a plurality of satellites 110-113 and 120-123 may be launched and deployed as an orbiting platform for various software applications. To generate the applications, design platform 175 is provided, which may include various tools and APIs that permit organizations to generate the software applications. In some implementations, design platform 175 may provide users with selectable functions and interface elements that are available on each of the satellites. Using the functions and available interface elements, the developer or developers for a particular organization may generate a software application that performs desired operations. For example, a developer may generate an application that uses a camera on a satellite to track movements of relevant objects.

Once the application is developed, the application may be provided to verification platform 176, which can be used to verify and test the application before deploying the application to the satellite platform. Verification platform 176 may comprise a physical or virtual testbed, wherein the application can be deployed to one or more test satellites to determine the functionality of the application. In some implementations, in addition to testing the functionality, verification platform may further apply tests to the application to ensure that the application is approved for operating on the physical platform. These tests may include, but are not limited to, ensuring the application is not malicious to other applications that may execute on the same satellite, ensuring the application does not change the flight structure or operations of the satellite, ensuring the data is properly communicated between other satellites and the ground control system, or any other similar tests to verify the operation of the application.

In addition to developing and verifying the application, availability platform 177 may be used as part of ground control system 170 to schedule the application in the orbiting cluster. This scheduling may be used to determine satellites that apply to the operations of an application, operation times on each of the satellites, processing, communication, and sensor resources of the application, or any other similar scheduling for the satellite platform. In at least one implementation, availability platform 177 may receive user input regarding deployment requirements for a software application, wherein the deployment requirements may comprise geographic areas on Earth of interest, operation times of interest, sensor requirements, processing requirements, security requirements, cost constraints, or any other similar deployment requirement, including combinations thereof. Additionally, availability platform 177 may identify availability information for resources in the satellite platform, and may determine deployment options for the deployment of a software application based on the deployment requirements and the availability information for the satellite platform. Once the deployment options are identified, they may be provided to the developer of the software application, wherein the developer may use the options to select a deployment of the application in the platform. In some implementations, the application may be implemented using the current satellites in orbit, however, it should be understood that the options provided to the developer may also provide options to add additional satellites to the platform to provide the desired operation.

Once a deployment option is selected via availability platform 177, ground control system 170 may initiate an uplink with one or more of the satellites to provide the application to the satellites, as well as update any scheduling information for the satellites. Once uploaded to the desired satellites, the application may begin execution based on the scheduling determined at availability platform 177. In some implementations, the uplink from ground control system 170 may be solely responsible for providing the applications to the required satellites. In other implementations, ground control system 170 may supply an application to a first subset of satellites, which may then distribute the application to one or more other satellites of the satellite platform. For example, ground control system 170 may provide a first application to satellite 120, wherein satellite 120 may, in turn supply the application to other satellites in a peer group. In particular, satellite 120 may provide the application to satellite 110 that is in the same peer group, permitting satellite 110 to provide operations of the application without directly receiving the communication from ground control system 170. Additionally, similar to providing the initial configuration to the satellites, ground control system 170 may further be used to supply updates to each of the applications operating in the satellite platform, and may further update any scheduling information on each of the satellites.

Also illustrated in satellite environment 100 is launch system 180, which may be used to transport satellites (sats) 181 into orbit with orbiting satellites 110-113 and 120-123. Satellites 181 include a hardware and software configuration that permits applications to execute as virtual nodes on the satellites. In some implementations, satellites 181 may be launched using launch system 180 without applications, and instead may be provided with a base operating system or hypervisor that can be used to load and execute applications as they are provided in an uplink from ground control system 170. In other implementations, satellites 181 may be configured with a first set of applications capable of being executed via an operating system or hypervisor on the satellites. Thus, once into orbit, the applications may initiate execution to provide the operations of the applications. These applications may further be added to, removed, and modified based on information provided in the uplink from ground control system 170.

In some implementations, the satellite platform may manage the operations of the various applications based on a quality of service allocated to each of the applications. This quality of service may be used to manage the resources (processing, sensor, communication, and the like) associated with each of the virtual nodes, wherein the quality of service may be based on a pricing tier for the application, an object of interest being monitored by an application, or some other similar quality of service allocation. For example, a virtual node without an object of interest on Earth may be allocated a first quality of service, however, when an object of interest is defined for the virtual node, the quality of service may be changed for the virtual node to provide adequate resources for monitoring the object.

In some implementations, in addition to or in place of allocating qualities of service to the virtual nodes, communications between the satellites and the ground control system may be prioritized based on a quality of service associated with the data packet. For example, data packets that are used to communicate with the ground control system and/or receive a configuration from the ground control system may be provided with a higher quality of service than other packets transmitted within the environment. In this manner, each of the satellites may inspect the packets for an identifier of the type of packet, and prioritized the packets based on the type of packet.

Figure 2:
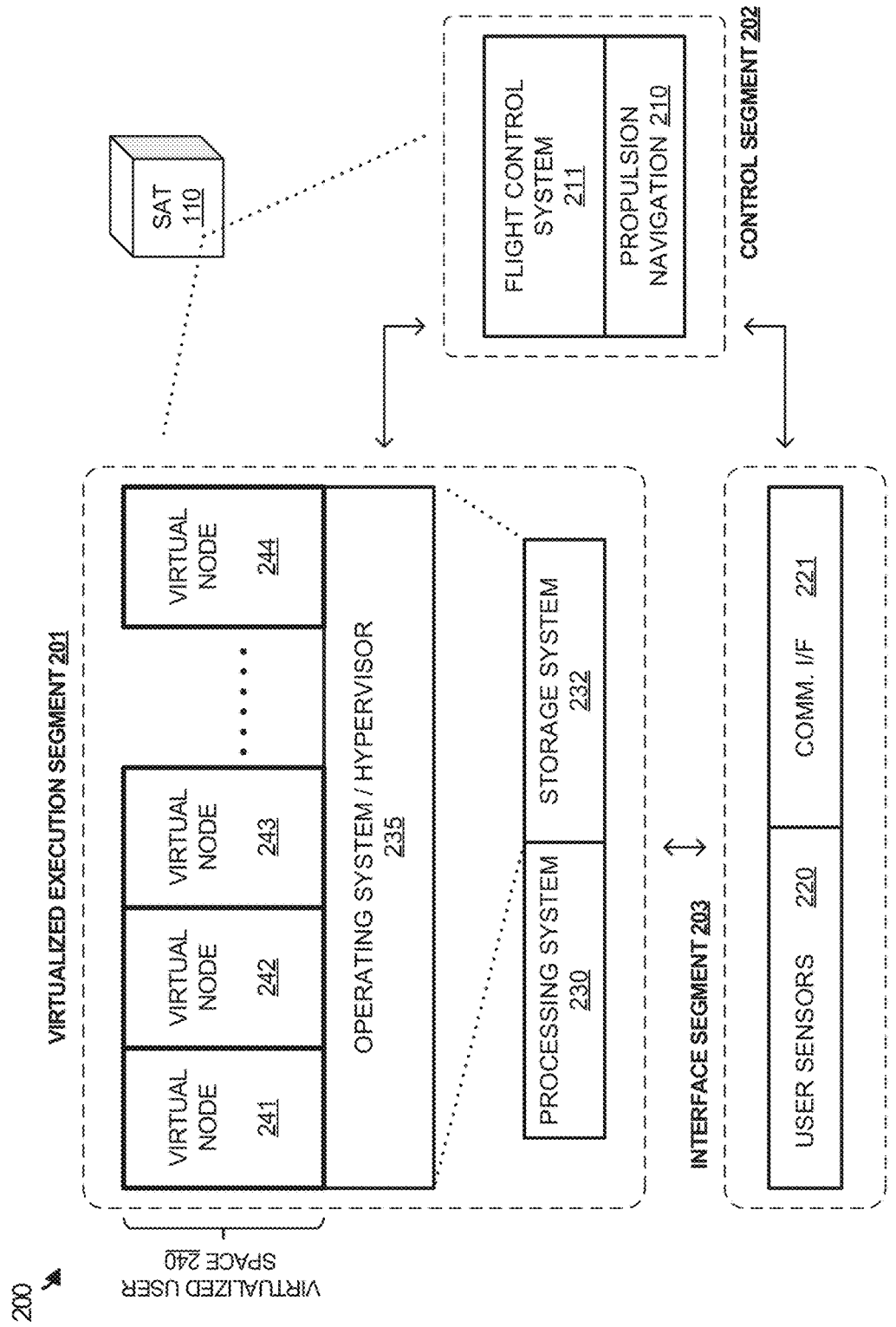
FIG. 2 illustrates an expanded view of a satellite capable providing a platform for virtual nodes according to an implementation.

FIG. 2 illustrates an expanded view 200 of a satellite 110 capable of providing a platform for virtual nodes according to an implementation. Satellite 110 includes virtualized execution segment 201, control segment 202, and interface segment 203, which may be coupled using various communication links. Virtualized execution segment 201 is representative of a virtualized execution system, which includes a virtualized user space 240 for virtual nodes 241-244, an operating system or hypervisor 235, a storage system 232 to store the operating system and virtual user space, and a processing system 230. Control segment 202 further includes flight control system 211 and propulsion navigation 210. Interface segment 203 further includes user sensors 220 and communication interface 221, wherein communication interface 221 may be used for ground communication and inter-satellite communication. User sensors 220 may include imaging sensors, temperature sensors, light sensors, or some other similar sensor capable of interaction with virtual nodes 241-244.

As described herein, organizations may generate applications that are capable of being deployed as virtual nodes on one or more satellites of a satellite platform. These applications may be provided from a ground control system, or may be provided from another satellite via communication interface 221 on satellite 110. Once the applications are provided, operating system/hypervisor 235, which is stored on storage system 232 and executed by processing system 230 may provide a platform for the execution of the applications. Here, each application provided to satellite 110 is executed as a separate virtual node in virtual nodes 241-244, wherein the virtual nodes may comprise full operating system virtual machines or containers capable of sharing resources from the underlying operating system in storage system 232.

To manage the execution of the virtual nodes, operating system/hypervisor 235 may manage a schedule that is used to allocate processing resources of processing system 230 to each of the nodes, user sensors 220 to each of the nodes, and other similar resources on satellite 110. In particular, the schedule may be used to ensure that each application is scheduled to receive processing resources from processing system 230 during defined time periods, and receive access to user sensors 220 during defined time periods. In some implementations, one or more of the applications may execute during the same time period on satellite 110. These applications may use different sensors in user sensors 220, may time share the use of sensors in user sensors 220, or may use the same data from user sensors 220 in their operation. To allocate the sensors operating system 235 may be responsible for providing each operating virtual node with a communication link to the required user sensor, and deallocating or removing the communication link to the required sensor based on the scheduling. For example, an imaging device may be accessed by virtual node 241 during a first-time period, wherein virtual node 241 may access the sensor based on addressing information provided by operating system 235. Once the time period expires, operating system 235 may prevent virtual node 241 from accessing the sensor, in some examples, by removing the addressing access of the virtual node, and allocating access of the sensor to a second virtual node.

In some implementations, operating system 235 may, in conjunction with communication interface 221, prioritize communications with other satellites and the ground control system. In particular, for each packet to be transferred from the satellite, the packet may be inspected to determine a quality of service associated with the packet. These packets may include packets received from other satellites to be forwarded to another satellite or ground control system, packets from the ground control system to be transmitted to other satellites, and packets generated by virtual nodes local to the satellite. When a packet is identified for transmission, a quality of service may be determined for the packet, and the packet may be transmitted based on the quality of service. In some implementations, the satellite may inspect the packet for packet type identifier information (e.g. a header flag). Once the flag is identified, the packet may be placed in a queue for transmission based on the identified flag. Similar operations may also be performed on packets that are received from other satellites and/or the ground control system, wherein the packets may be placed in a processing queue based on the priority of the packet.

In some examples, in addition to or in place of the packet transmission operations, operating system 235 may further be used to manage a quality of service assigned to each of the virtual nodes. In managing the quality of service, operating system 235 may allocate resources to each of the virtual nodes based on the location of the satellite in orbit, based on a particular task assigned to the virtual node, based on a payment tier for the virtual node, or some other similar quality of service definition. For example, a virtual node may be dedicated to monitoring a particular region. Consequently, the virtual node may be provided with first resources when the satellite's orbit covers the region of interest, but may be provided with second resources when the satellite moves outside the region of interest. In this manner, the satellite may identify a quality of service modification event, in this example moving outside the area of interest, and modify the resources provided to the virtual nodes.

In addition to the virtual node operations provided in virtualized execution segment 201, satellite 110 further includes control segment 202. Control segment 202, which may be communicatively linked to virtualized execution segment 201 and interface segment 203, is responsible for logistical control elements of the satellite of satellite 110. The operations may include managing the deployment of solar panels on the satellite, managing the positioning of the satellite with regards to the Earth or the sun, or any other similar operation. In at least one example, flight control system 111 may monitor for requests from operating system 235, and determine whether the satellite is capable of accommodating the request from operating system 235. For example, virtual node 241 may generate a request to move a user sensor, which also requires movement using propulsion and navigation 210. In response to the request, flight control system 211 may determine that the movement cannot be made, and may prevent the movement of the satellite using propulsion and navigation 210. Further, in some implementations, flight control system 211, may provide a notification to operating system 235 and virtual node 241 indicating that the movement is not permitted.

Although illustrated as a separate system in the example of FIG. 2, it should be understood that in some examples, flight control system may be implemented and stored on processing system 230 and storage system 232. However, it should also be understood that flight control system may be stored on a separate storage system and use a different processing system than operating system 235 and its corresponding virtual nodes.

Figure 3:
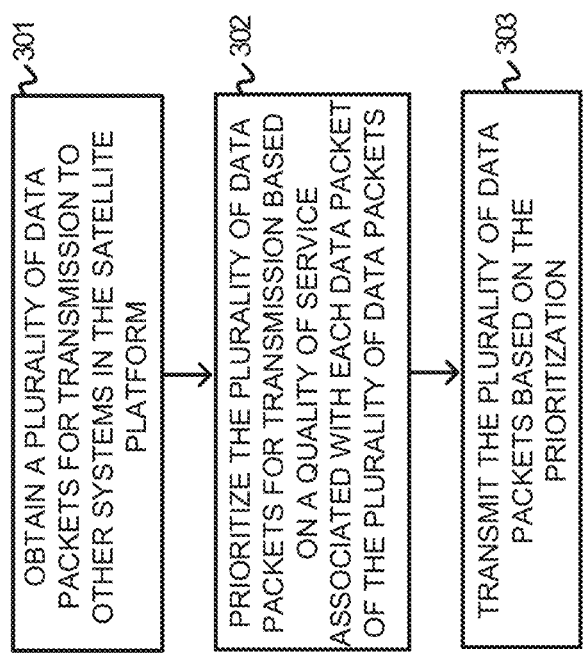
FIG. 3 illustrates an operation of a satellite to manage data packet communications according to an implementation.

FIG. 3 illustrates an operation of a satellite to manage data packet communications according to an implementation. The operations in FIG. 3 are referenced parenthetically in the paragraphs that follow with reference to systems and objects of satellite environment 100 of FIG. 1. In particular, the examples provide of FIG. 3 are provided with references to satellite 121, however, it should be understood that similar operations may be provided by other satellites of the satellite platform.

As depicted in FIG. 3, a satellite is directed to obtain (301) a plurality of data packets for transmission to one or more other systems of the satellite platform. These packets may be obtained from ground control system 170, may be obtained from other satellites of the satellite platform, or may be generated locally via the virtual nodes on the satellite. For example, the packets for transmission by satellite 121 may be received from satellites 111, 120, or 122, may be received from ground control system 170, or may be generated by virtual nodes executing on satellite 121. As the packets are obtained for transmission, satellite 121 may prioritize (302) the plurality of data packets for transmission based on a quality of service associated with each data packet of the plurality of data packets. Once prioritized, the plurality of data packets may be transmitted (303) based on the prioritization. For example, each of the packets may be provided with a quality of service based on the type of information contained within the data packet. As an example, packets that are used to configure a particular operation within the satellite platform may be prioritized over other packets to be transmitted by satellite 121. Advantageously, this prioritization may be used to assist in the distribution of an application configuration when the configuration is time sensitive for the satellite platform. For instance, if a developer or administrator required observation of an object of interest, when the configuration is provided to the satellite platform via an uplink from the ground control system, the satellites may prioritize the configuration packets over other packets being communicated by the satellite.

Although the previous example provides one instance of prioritization, it should be understood that other instances of prioritization may be implemented in addition to or in place of prioritizing the configuration packets. This prioritization may include prioritizing state data for sensor observations by the satellites, prioritizing health check packets between the satellites, or some other similar prioritization. In some implementations, in determining the priority of a packet, the satellite may perform packet inspection to identify attributes within the header of the packet, wherein the attributes may comprise values or flags indicating the priority of the packet in relation to other packets.

Moreover, while demonstrated in the example of FIG. 3 as prioritizing packets for transmission, it should be understood that similar operations may be performed on received packets. In particular, as packets are received via the communication interface, the satellite may determine the priority associated with each of the packets. Once the priority is determined, the packets may be placed in corresponding queues, such that packets with a higher priority are processed in a different manner than packets with a lower priority. These queues may be allocated a portion of clock cycles by the processing system, memory, processing cores, or some other similar processing resource.

Figure 4:
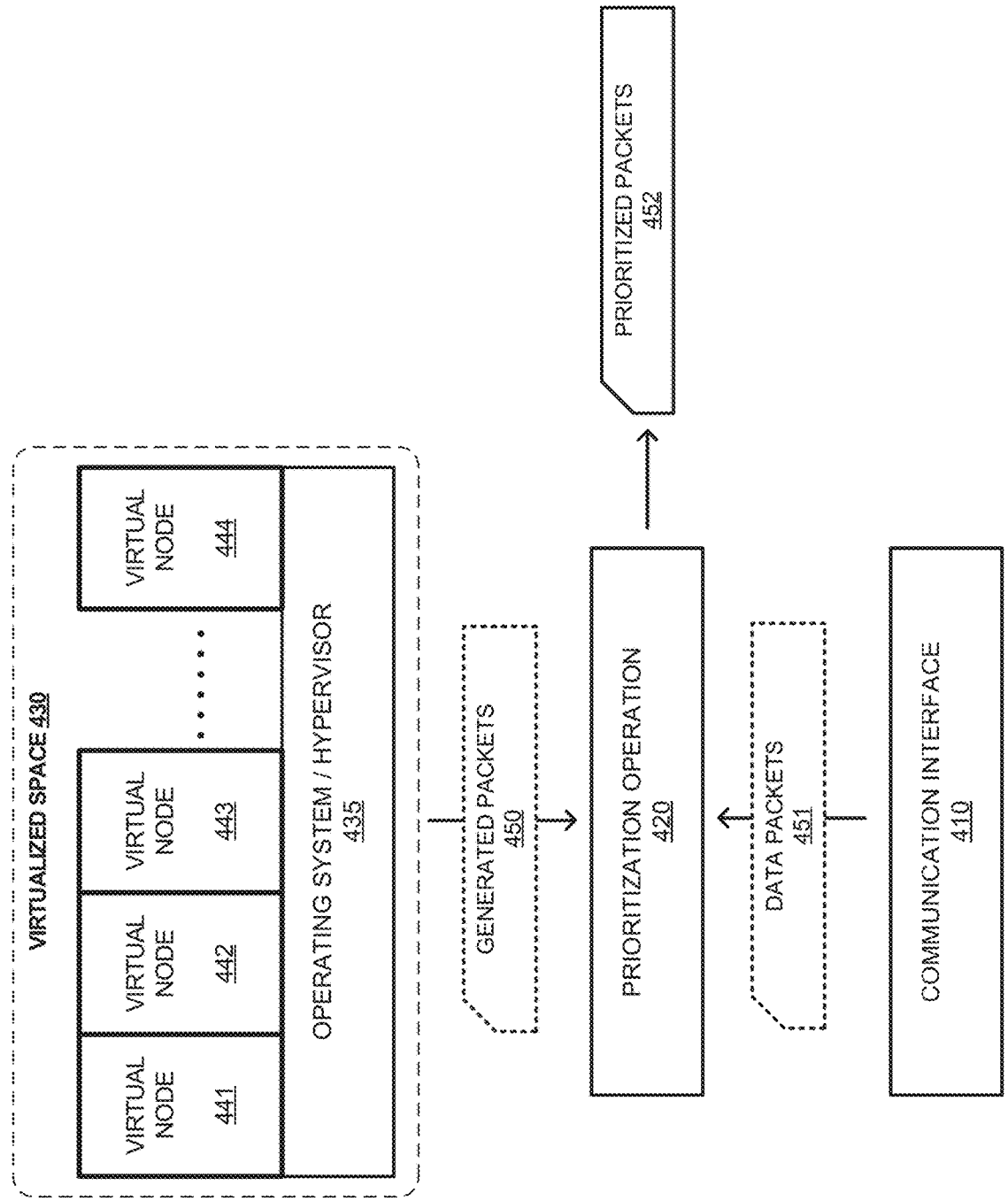
FIG. 4 illustrates an overview of managing the prioritization of data packets according to an implementation.

FIG. 4 illustrates an overview of managing the prioritization of data packets according to an implementation. FIG. 4 includes virtualized space 430, prioritization operation 420, communication interface 410 and packets 450-452.

In operation, virtualized space 430 provides a platform for virtual nodes 441-444, wherein virtual nodes 441-444 comprise virtual machines and/or containers that execute via operating system/hypervisor 435. During execution of the virtual nodes, which represent applications of various organizations deployed in the satellite, the virtual nodes may require communications with other satellites and/or the ground control system. In providing these communications, the packets are provided from virtualized space 430 to prioritization operation 420. In addition to the packets from the virtualized space, prioritization operation 420 further receives data packets 451 from communication interface 410. These data packets may comprise packets from other satellites, as well as packets from a ground control system for the satellite platform. The data packets may include configuration information to be forwarded to other satellites, application data (processed or unprocessed) obtained at one or more other satellites, health check information, or any other similar information.

Once the packets are obtained by prioritization operation 420, prioritization operation 420 may generate prioritized packets 452 for transmission to at least one other system in the satellite platform. This at least one other system may comprise one or more other satellites or the ground control system in some implementations. In at least one example, in prioritizing the data packets for transmission, prioritization operation 420 may identify a packet type in each of the obtained data packets. For example, in the header of each of the data packets, the packets may include a tag or flag that indicates the type of packet, wherein the packet type may indicate a configuration packet, a packet destined for the ground control system, a state packet for an application operating in the satellite platform, a health check packet, or some other similar packet type. Based on the identifier in each of the packets, the packets may be prioritized such that packets that are more time sensitive may be transmitted ahead prioritized ahead of other packets that are not time sensitive.

Although the example in FIG. 4 provides an example of prioritizing packets that are to be transmitted to other systems in a satellite platform, it should be understood that similar operations may be applied to packets that are received and are to be processed via the satellite. In particular, as packets are received at communication interface 410 for processing by satellite 410, the packets may be prioritized based on the type of packet and/or the virtual node or application associated with the packet. For example, packets targeted for an application associated with a higher quality of service may be placed in a processing queue higher than packets for other applications.

Figure 5:
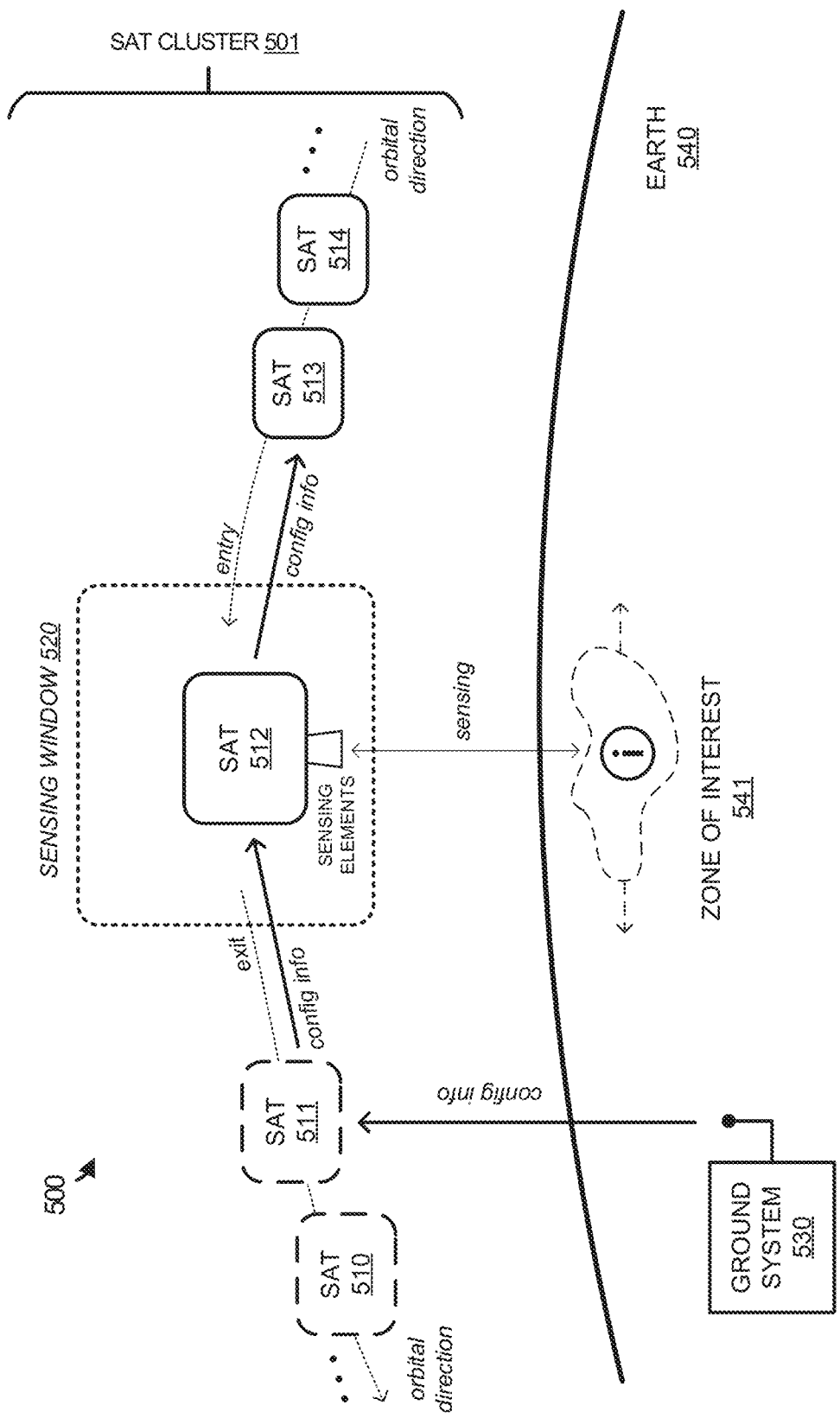
FIG. 5 illustrates an operational scenario of deploying a configuration to a satellite platform according to an implementation.

FIG. 5 illustrates an operational scenario 500 of deploying a configuration to a satellite platform according to an implementation. Operational scenario 500 includes ground system 530, earth 540, zone of interest 541, satellites 510-514 and sensing window 520. Although illustrated with five satellites in the present implementation, it should be understood that any number of satellites may be deployed as part of the satellite platform.

As depicted, satellites 510-514 orbit around Earth 540 to provide sensing operations for applications executing thereon. To provide the configurations and/or update the applications which operate as virtual nodes on the satellites, ground system 530 is provided, wherein ground system 530 may provide new applications to satellites 510-514, may provide updates to preexisting applications on satellites 510-514, or may provide a task configuration to a preexisting application on satellites 510-514. Here, zone of interest 541 is depicted to demonstrate an object or region of interest on Earth 540. This zone of interest may be defined by an administrator, may be defined by an automated process, or may be defined in any other similar manner. For example, based on data obtained from the satellites, an administrator of an application may desire additional data from zone of interest 541.

Once the zone of interest is identified, ground system 530 may provide, via an uplink, configuration information to a satellite within the uplink window for ground control system 530. In the present example, the satellite in the uplink window is satellite 511. Once configuration information is provided to satellite 511, satellite 511 may be required to forward the configuration to other satellites with orbits relevant to zone of interest 541. Here, the relevant orbits comprise satellites that come within a sensing window 520 to provide sensing data for zone of interest 541. As a result, satellite 511 may provide the configuration to satellite 512, which in turn forwards the configuration to satellite 513 to ensure that the next satellite receives the same configuration.

In forwarding the configuration information for zone of interest 541, satellites 511-513 may be configured to identify a quality of service for transmitted communications, and prioritize the egress packets from the satellites based on the quality of service. In some implementations, such as that depicted in FIG. 5, each of the satellites may be used to prioritize egress packets that are used to configure applications within the cluster. As an example, when the configuration information is received at satellite 511 from ground system 530, satellite 511 may prioritize the configuration packets based on information within the packets (e.g. a header flag indicating the packet comprises a control packet). Once prioritized, the configuration packets along with any other data packets may be forwarded to satellite 512 based on the prioritization. Similar operations may also be performed by other satellites in the environment in determining the priority for transmitting data packets.

Here, if a packet is received by a satellite associated with the configuration, the configuration may be provided to the corresponding virtual node. In this manner, the virtual node may update any required functions of the node to provide the functionality. For example, for zone of interest 541, the virtual node may be updated to request and receive imaging data from a sensor of the satellite, while the satellite is in sensing window 520 capable of retrieving data from the zone of interest.

Figure 6:
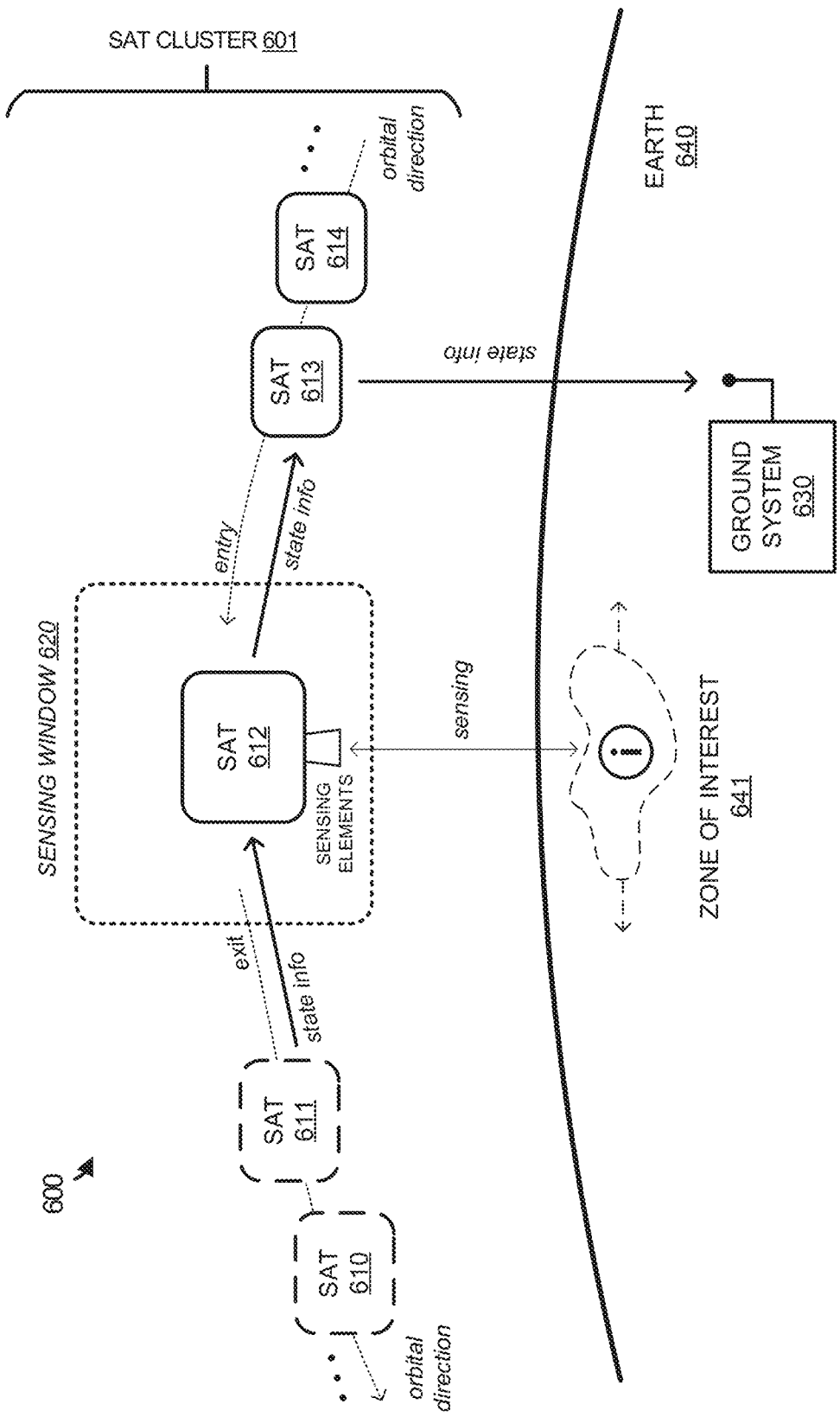
FIG. 6 illustrates an operational scenario of communicating state information according to an implementation.

FIG. 6 illustrates an operational scenario 600 of communicating state information according to an implementation. Operational scenario 600 includes ground system 630, earth 640, zone of interest 641, satellites 610-614 and sensing window 620. Although illustrated with five satellites in the present implementation, it should be understood that any number of satellites may be deployed as part of the satellite platform.

In operation, virtual nodes are deployed on satellites 610-614 to provide various operations on the satellites. These virtual nodes are used to segregate and manage different operations for different customers of the satellite platform. During the execution of the virtual nodes, the nodes may require the communication of state information to transmit processed and unprocessed data from sensors on the satellites, health check communications, or some other similar state information. For example, if a satellite of satellites 610-614 identified an object of interest, state information may be communicated from the satellite to ground system 630 to notify an administrator or some other personnel of the object of interest.

In the present implementation, satellite 611 identifies state information to be provided to ground system 630. Once identified, the state information is forwarded over satellites 612-613 to the ground system. In transferring the state information to ground system 630, the data packets for the transmission may be prioritized over other packets communicated by the satellites. For example, when the data packets are generated at satellite 611, a flag may be generated within the header of the packets to indicate a quality of service for the packet. Once transmitted, satellites 612-613 may provide packet inspection for the data packets and prioritize the packets based on the flag in the header. Thus, in relation to other data packets being communicated by satellites 612-613 the state information packets from satellite 611 may be provided with a higher quality of service (e.g. placed higher in a transmission queue, allocated to a different transmission queue, etc.).

Although this is one example of prioritizing packets between satellites and ground control systems, it should be understood that other packets may be prioritized and/or provided varying qualities of service. In some implementations, the headers of packets communicated between the elements of the satellite platform may include various values to indicate a quality of service associated with the packet. For example, packets that are used in configuring the operations of the application nodes on the satellites may be given a first quality of service value, packets that are to be delivered to the ground control system may be provided with a second quality of service value, and all other packets may be provided with a third quality of service value. In other examples, in addition to or in place of prioritizing packets based on the type of packet, the packets may be prioritized based on the application. For instance, a first application operating as virtual nodes across multiple satellites may be provided with a different quality of service than other applications operating across the same satellites. As a result of this configuration, packets for the first application may be prioritized for transmission differently than the other applications.

Figure 7A:
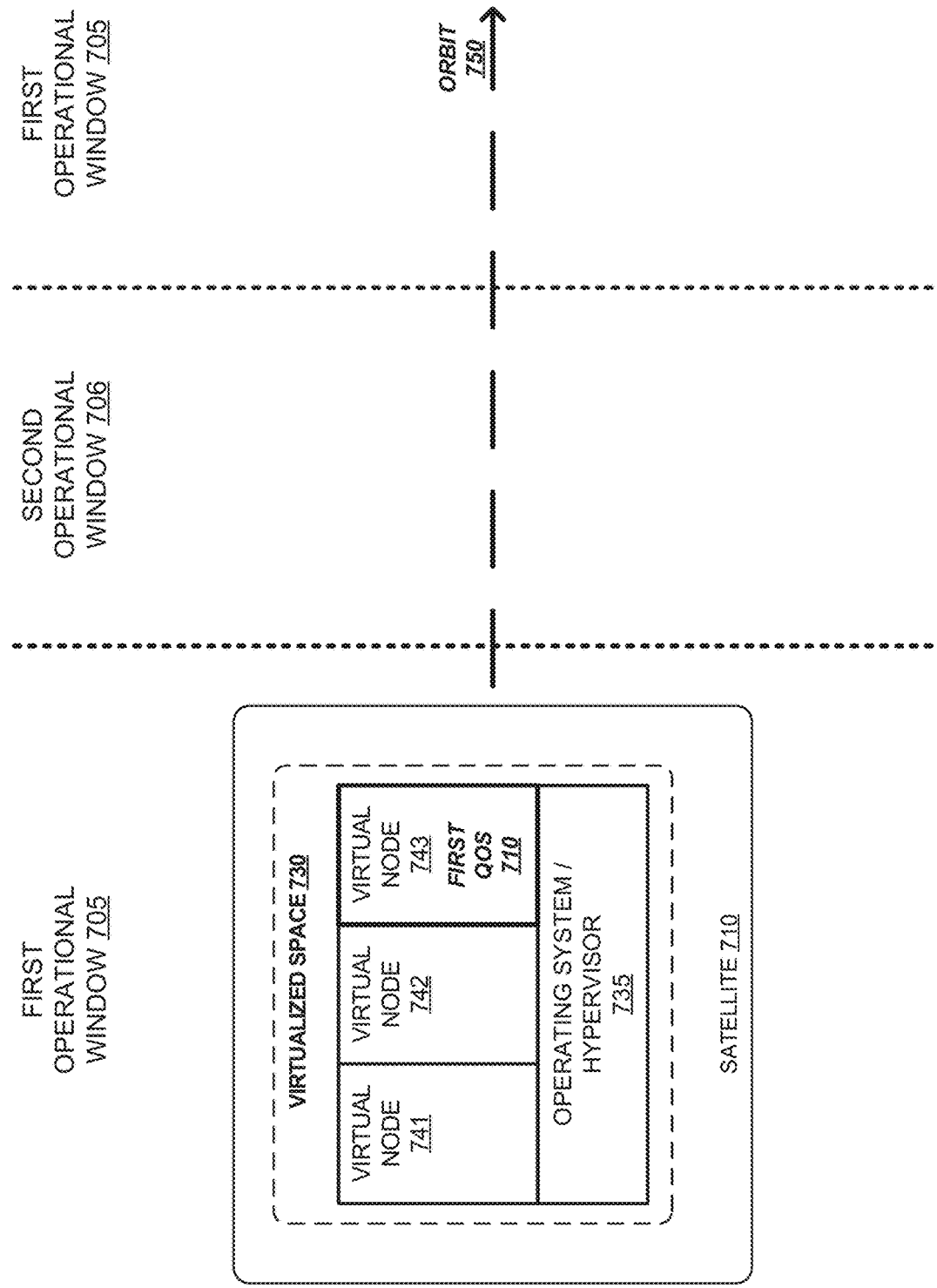
FIGS. 7A-7C illustrate an operational scenario of modifying virtual node quality of service based on geographic location according to an implementation.
Figure 7B:
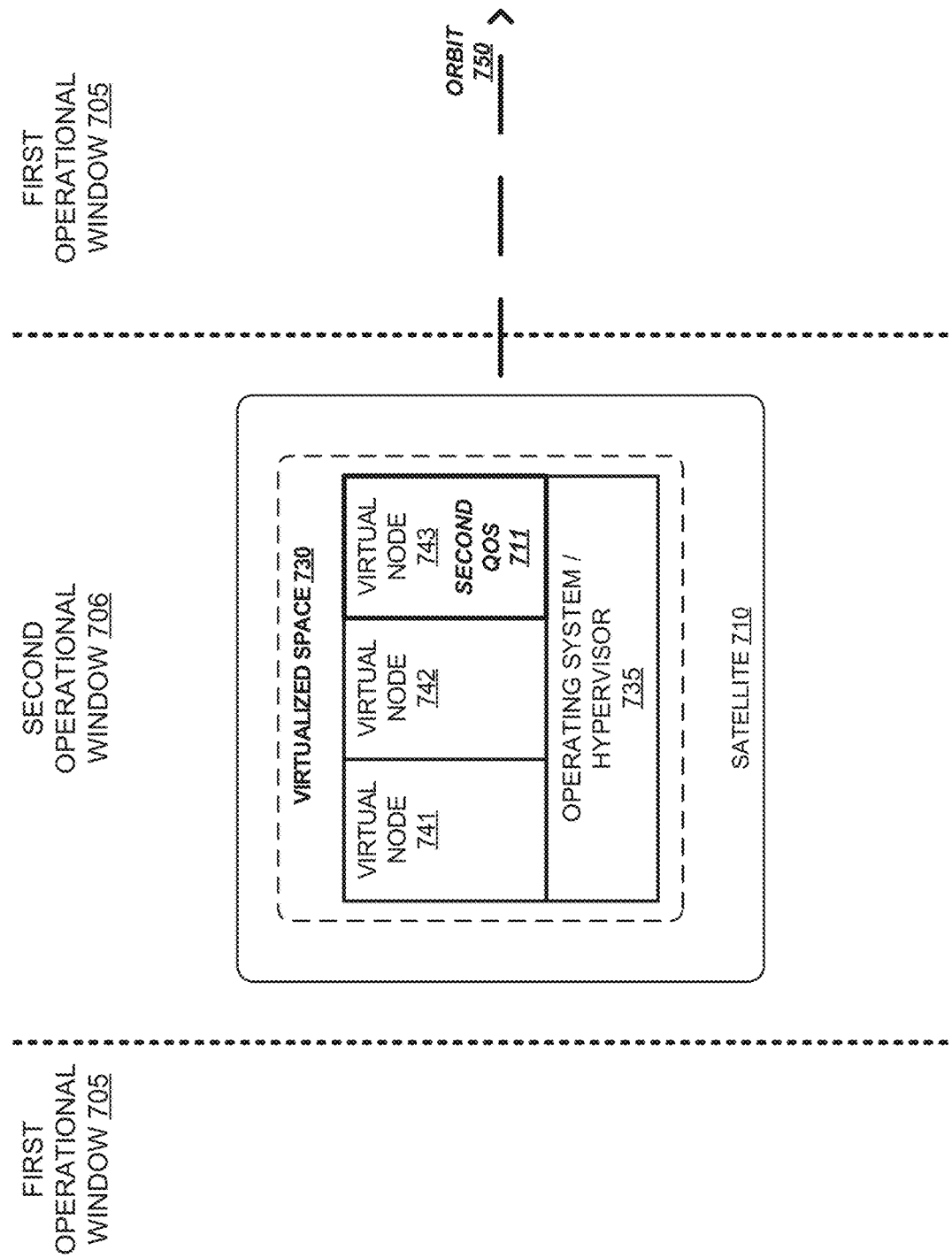
Figure 7C:
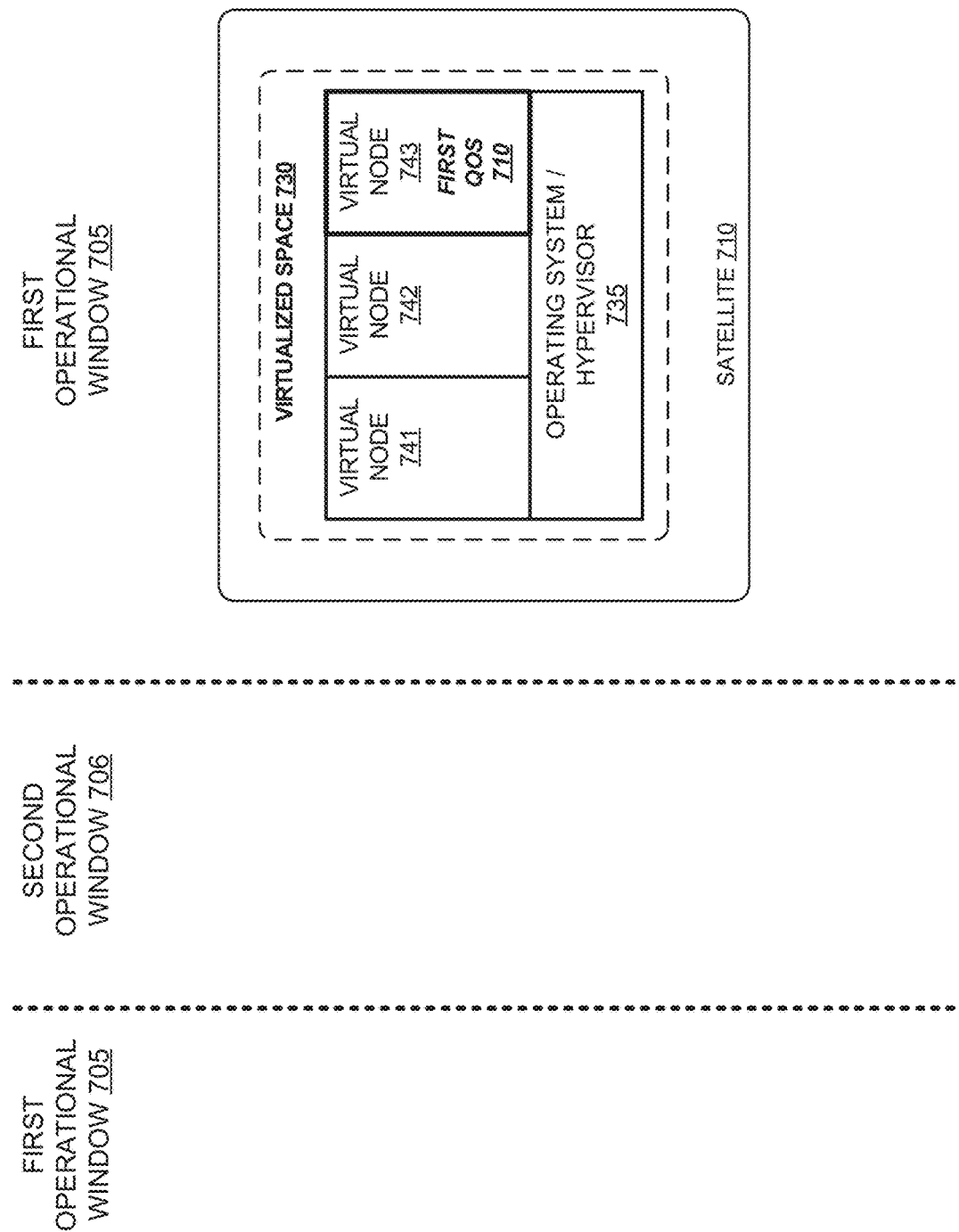

FIGS. 7A-7C illustrate an operational scenario of modifying virtual node quality of service based on geographic location according to an implementation. FIGS. 7A-7C include first operational window 705, second operational window 706, and satellite 710. Satellite 710 further includes virtualized space 730 with operating system/hypervisor 735, and virtual nodes 741-743. Virtual nodes 741-743 are deployed in the satellite to provide various operations for different organizations.

Referring first to FIG. 7A, satellite 710 is located in first operational window 705, wherein first operational window 705 may correspond to a geographic location or region of Earth. While in first operational window 705, virtual node 743 may be provided with a first quality of service (QoS) 710. This quality of service may define processing resources made available to virtual node (clock cycles, processing cores, etc.), availability of sensors to the virtual node, communications priority for the virtual node, and the like. For example, first operational window 705 may correspond to a geographic area that is not of interest to the functions of virtual node 743, such as when the satellite is over the Pacific Ocean and the application is targeted at the Atlantic Ocean. As a result, first QoS 710 that is provided to virtual node 743 may be lower than the other virtual nodes operating on satellite 710.

Turning to FIG. 7B, as satellite 710 traverses its orbit 750, the satellite moves into second operational window 706. Second operational window 706 is representative of a portion of the satellites orbit that corresponds to a different QoS (second QoS 711). Returning to the example of virtual node 743 tasked at monitoring objects in the Atlantic Ocean, when the satellite's orbit places the satellite in a location to monitor the geographic area of interest, virtual node 743 may be provided with a different QoS. This may include providing the virtual node with additional processing resources, additional access to the sensors of the satellite, a higher priority for inter-satellite and ground control communications, or some other similar modification to the quality of service. Thus, rather than providing a single quality of service to each of the virtual nodes, the virtual nodes may be provided with multiple quality of service settings based on the location of the satellite in the satellite's orbit.

Referring to FIG. 7C, when satellite 710 traverses orbit 750 and reenters first operational window 705, virtual node 743 again returns to first QoS 710. This ensures that the virtual node is provided with a dynamic quality of service, permitting additional resources to be allocated to other virtual nodes of the satellite or conserving power resources for the satellite. Thus, although not depicted in FIGS. 7A-7C, when resources are allocated or taken away from virtual node 743, virtual nodes 741-742 may also have modifications made to their quality of service. These modifications may occur during the same operational windows as virtual node 743, but may also be independent of the quality of service state changes for virtual node 743. For example, the quality of service allocated to virtual node 741 may be modified at different intervals during the orbit of the satellite to provide the desired functionality for the virtual node.

Although illustrated as geographic movement acting as the event that causes the quality of service modification, it should be understood that the quality of service allocated to each of the virtual nodes may be dynamic and based on instructions from the ground system and/or other satellites of the platform. As an example, when an object of interest is identified by a first satellite, the first satellite may transfer a task configuration to a second satellite to provide additional information about the object of interest. This tasking of a second satellite may be used to modify the quality of service associated with the virtual node supporting the application to monitor the object of interest. As a result, the quality of service may be increased during observation windows where the second satellite can observe the object of interest.

Figure 8:
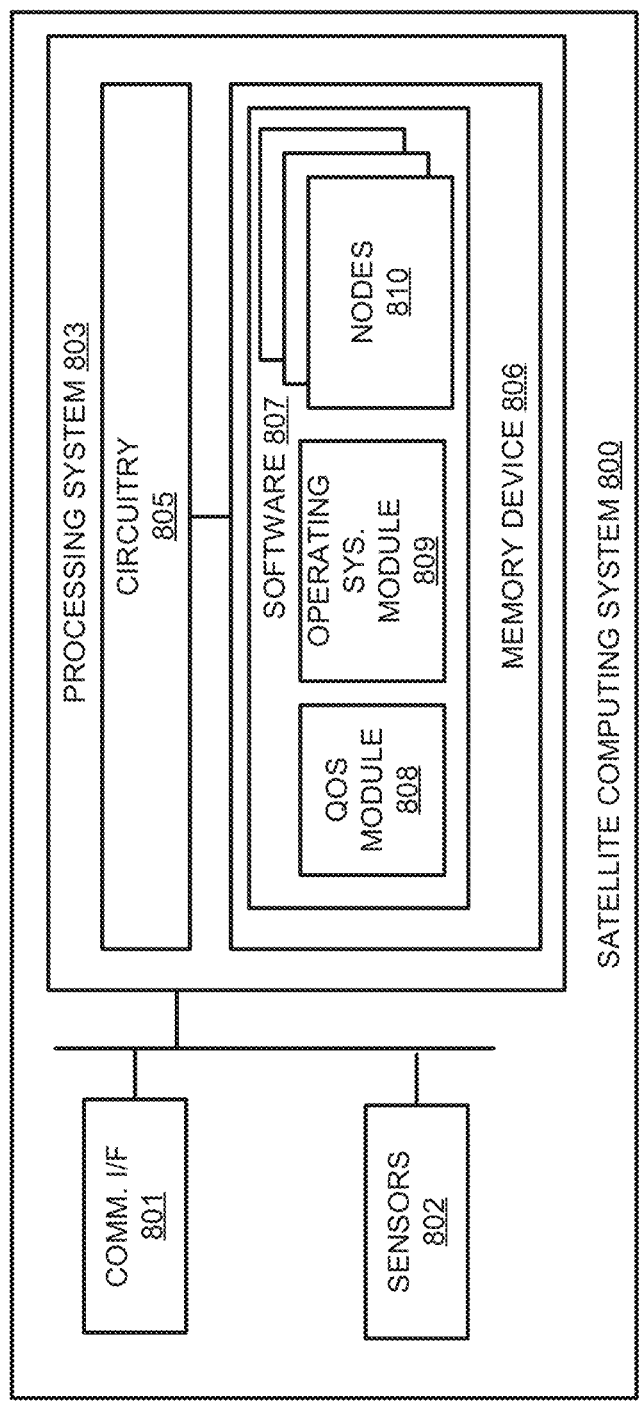
FIG. 8 illustrates a satellite computing system according to an implementation.

FIG. 8 illustrates a satellite computing system 800 according to an implementation. Computing system 800 is representative of any computing system or systems with which the various operational architectures, processes, scenarios, and sequences disclosed herein for a satellite may be implemented. Computing system 800 is an example of a satellite from FIGS. 1-7, although other examples may exist. Computing system 800 comprises communication interface 801, sensors 802, and processing system 803. Processing system 803 is linked to communication interface 801 and sensors 802. Sensors 802 may comprise imaging sensors, heat sensors, light sensors, or some other similar type of sensor. Processing system 803 includes processing circuitry 805 and memory device 806 that stores operating software 807. Computing system 800 may include other well-known components such as a battery, solar panels, and enclosure that are not shown for clarity.

Communication interface 801 comprises components that communicate over communication links, such as network cards, ports, radio frequency (RF), processing circuitry and software, or some other communication devices. Communication interface 801 may be configured to communicate over wireless links. Communication interface 801 may be configured to use Time Division Multiplex (TDM), Internet Protocol (IP), wireless protocols, communication signaling, or some other communication format—including combinations thereof. In some implementations, communication interface 801 may communicate with one or more other satellites in a satellite platform and communicate with a ground control system.

Processing circuitry 805 comprises microprocessor and other circuitry that retrieves and executes operating software 807 from memory device 806. Memory device 806 may include volatile and nonvolatile, removable and non-removable media implemented in any method or technology for storage of information, such as computer readable instructions, data structures, program modules, or other data. Memory device 806 may be implemented as a single storage device, but may also be implemented across multiple storage devices or sub-systems. Memory device 806 may comprise additional elements, such as a controller to read operating software 807. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 805 is typically mounted on a circuit board that may also hold memory device 806 and portions of communication interface 801 and sensors 802. Operating software 807 comprises computer programs, firmware, or some other form of machine-readable program instructions. Operating software 807 includes quality of service (QoS) module 808, operating system module 809, and nodes 810, although any number of software modules may provide the same operation. Operating software 807 may further include utilities, drivers, network interfaces, applications, or some other type of software. When executed by processing circuitry 805, operating software 807 directs processing system 803 to operate computing system 800 as described herein.

In at least one implementation, operating system module 809 provides a platform for nodes 810, which are representative of containers or virtual machines that support various operations on the satellite. In particular, to provide separation and security between different customers applications, each of the applications may be deployed in the satellite as virtual nodes that each provide a separate namespace, storage, and access to sensors and communication systems. In the present implementation, in providing the operations of nodes 810, QoS module 808 is provided that manages that quality of service provided to the execution of each of the nodes and the communications with other systems of the satellite platform.

In one example, QoS module 808 may be used to identify and allocate different qualities of service to each of nodes 810 based on the orbit of satellite computing system 800. For instance, when the satellite orbits over a first geographic location, QoS module 808 may provide a first quality of service to a node. This quality of service may include processing resources, sensor resources, communication resources, and the like. As the satellite traverses its orbit, the satellite may orbit over a second geographic location. Based on this change in geographic location, QoS module 808 may be used to provide a different quality of service to the node. Consequently, the quality of service allocated to each of the nodes may be dynamic based on the current location of the satellite in its orbit. This may permit nodes to be provided with a higher quality of service in some locations, while provided with a lower quality of service in other locations of the orbit.

In other examples, in addition to or in place of allocating various qualities of service to the nodes executing on the satellite, qualities of service may also be placed on the communications with other satellites and/or the ground control system. In some implementations, this may include identifying packets to be transmitted by satellite computing system 800, prioritizing the packets for transmission based on a quality of service associated with each of the packets, and transmitting the packets based on the transmission. In identifying the priority, in some examples the packets may include a tag or quality of service value that is used to define the quality of service of the packet in relation to other packets to be transmitted. These values may indicate whether a packet corresponds to a configuration packet, a health check packet, a state packet between application nodes of satellites, a packet destined for the ground control system, or some other similar indication of the type of packet. Once the quality of service is identified for the packet, the packet may be placed in a queue for transmission. These queues may ensure that packets of a higher priority are transmitted more quickly than packets with a lower quality of service.

Although described in the previous example as prioritizing packets for transmission it should be understood that similar operations may be applied to packets as they are received from the ground control system and/or other satellites of the platform. In particular, as packets are received, the packets may be inspected to determine a quality of service associated with the packet. Once the quality of service is determined, QoS module 808 may be used to place the packet into a corresponding queue for processing on satellite computing system 800. For example, configuration packets that are received from a ground control system may be provided with a higher quality of service than other packets that are received at the satellite computing system. Consequently, when a configuration packet is identified, the packet may be placed in a processing queue (which is provided its own processing resources, such as clock cycles, processing cores, etc.) such that resources may be provided to the packet ahead of other packets received by satellite computing system 800.

In some implementations, in prioritizing the packets for transmission or for processing after receipt, the packets may be prioritized based on the source or destination virtual node for the packet. For example, a first virtual node may be provided with a higher quality of service than the other virtual nodes executing on the satellite. As a result of this configuration, when a communication is required for the first virtual node, the packets may be prioritized ahead of the other virtual nodes of the satellite. In some examples, this quality of service for transmitting and receiving packets may be dynamic based on the orbit of the satellite. Thus, in a first period of the orbit a virtual node may be provided with a first quality of service for data packet communication, while in a second period of the orbit the virtual node may be provided with a second quality of service for data packet communication.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a satellite of a satellite platform, the method comprising:
    determining a first quality of service level for at least execution of at least a virtual node on the satellite employed to capture sensor data;

obtaining sensor data corresponding to an underlying object or region of interest;
establishing a plurality of data packets comprising the sensor data to be transmitted to at least one other system of the satellite platform;
allocating at least transmission resources of the satellite to at least the virtual node of the satellite based on the first quality of service level;
determining a quality of service modification event associated with at least a location of the satellite in orbit corresponding to the underlying object or region of interest for which the sensor data has been obtained;
in response to the quality of service modification event, allocating at least the transmission resources of the satellite to at least the virtual node based on a second quality of service level;
determining at least a transmission prioritization for at least the plurality of data packets based on the second quality of service level associated with the location of the satellite in orbit; and
transmitting the plurality of data packets based on the transmission prioritization.

2. The method of claim 1, wherein establishing the plurality of data packets comprises receiving a first subset of the plurality of data packets from at least one other satellite of the satellite platform and establishing a second subset of the plurality of data packets comprising the sensor data from at least the virtual node executing on the satellite.

3. The method of claim 2, wherein establishing the plurality of data packets further comprises receiving a third subset of the plurality of data packets from a ground control system of the satellite platform.

4. The method of claim 1, further comprising:
determining a further prioritization for at least the plurality of data packets based on a packet type associated with each of the plurality of data packets.

5. The method of claim 4, wherein the packet type comprises a configuration packet type to configure a virtual node on a second satellite of the satellite platform or a state information packet type to exchange state information with a second system of the satellite platform.

6. The method of claim 1, wherein the at least one other system comprises a ground control system or an additional satellite.

7. The method of claim 1 further comprising:
receiving a second plurality of data packets from one or more other systems of the satellite platform;
prioritizing the second plurality of data packets for processing by at least a virtual node of the satellite based on the second quality of service level associated with the location of the satellite in orbit for the second plurality of data packets.

8. A satellite comprising:
one or more non-transitory computer readable storage media;
a processing system operatively coupled to the one or more non-transitory computer readable storage media; and
program instructions stored on the one or more non-transitory computer readable storage media to manage data packets communicated over the satellite that, when read and executed by the processing system, direct the processing system to at least:
determine a first quality of service level for at least execution of at least a virtual node on the satellite employed to capture sensor data;
obtain sensor data corresponding to an underlying object or region of interest;
establish a plurality of data packets comprising the sensor data to be transmitted to at least one other system of a satellite platform, wherein the satellite platform comprises a plurality of satellites;
allocate at least transmission resources of the satellite to at least the virtual node of the satellite based on the first quality of service level;
determine a quality of service modification event associated with a location in orbit encountered by the satellite corresponding to the underlying object or region of interest for which the sensor data has been obtained;
in response to the quality of service modification event, allocate at least the transmission resources of the satellite to at least the virtual node based on a second quality of service level;
determine at least a transmission prioritization for at least the plurality of data packets based on the second quality of service level associated with the location in orbit for the plurality of data packets; and
transmit the plurality of data packets based on the transmission prioritization.

9. The satellite of claim 8, wherein establishing the plurality of data packets comprises receiving a first subset of the plurality of data packets from at least one other satellite of the satellite platform and identifying a second subset of the plurality of data packets comprising the sensor data from at least the virtual node executing on the satellite.

10. The satellite of claim 9, establishing the plurality of data packets further comprises receiving a third subset of the plurality of data packets from a ground control system of the satellite platform.

11. The satellite of claim 8, wherein determining at least the transmission prioritization for at least the plurality of data packets further comprises determining a further prioritization for at least the plurality of data packets based on a packet type associated with each of the plurality of data packets.

12. The satellite of claim 11, wherein the packet type comprises a configuration packet type to configure a virtual node on a second satellite of the satellite platform or a state information packet type to exchange state information with a second system of the satellite platform.

13. The satellite of claim 8, wherein the at least one other system comprises a ground control system or an additional satellite of the plurality of satellites.

14. The satellite of claim 8, wherein the program instructions further direct the processing system to:
receive a second plurality of data packets from one or more other systems of the satellite platform;
prioritize the second plurality of data packets for processing by at least the virtual node of the satellite based on the second quality of service level associated with the location in orbit for the second plurality of data packets.

15. The satellite of claim 8, wherein the program instructions further direct the processing system to execute a plurality of virtual nodes, and wherein determining at least the transmission prioritization for at least the plurality of data packets based on the second quality of service associated with the location in orbit for the plurality of data packets further comprises prioritizing the plurality of data packets based on a source virtual node corresponding to the plurality of virtual nodes for each of the plurality of data packets.

16. A method of operating a satellite, the method comprising:
- obtaining sensor data corresponding to an underlying object or region of interest;
- determining quality of service levels for at least execution of one or more virtual nodes on the satellite employed to capture the sensor data;
- allocating first resources of the satellite to the one or more virtual nodes based on first quality of service levels associated with each of the one or more virtual nodes;
- identifying a quality of service modification event associated with at least a location of the satellite in orbit corresponding to the underlying object or region of interest for which the sensor data has been obtained; and
- in response to the quality of service modification event, allocating second resources of the satellite to the one or more virtual nodes based on second quality of service levels associated with each of the one or more virtual nodes.

17. The method of claim 16, wherein the first resources and the second resources comprise processing resources, sensor resources, and data communication resources.

18. The method of claim 16, wherein the one or more virtual nodes comprise virtual machines or containers.

19. The method of claim 16, wherein identifying the quality of service modification event comprises identifying a movement of the satellite in orbit from over a first geographic region to over a second geographic region.

20. The method of claim 16, wherein identifying the quality of service modification event comprises receiving at least one configuration packet, wherein the at least one configuration packet provides a task to a target virtual node among the one or more virtual nodes.

* * * * *